(12) United States Patent
Welbourne (10) Patent No.: US 6,981,469 B1
(45) Date of Patent: Jan. 3, 2006

(54) LATERALLY EJECTING FLUID FLOW CONTROL SYSTEM AND METHOD

(75) Inventor: Stephen B. Welbourne, Pittsfield, IL (US)

(73) Assignee: Welbourne Innovations, Inc., Pittsfield, IL (US)

( * ) Notice: Subject to any disclaimer, the term of this patent is extended or adjusted under 35 U.S.C. 154(b) by 24 days.

(21) Appl. No.: 10/613,840

(22) Filed: Jul. 5, 2003

Related U.S. Application Data (63) Continuation-in-part of application No. 10/128,223, filed on Apr. 24, 2002, now abandoned.

(60) Provisional application No. 60/404,001, filed on Aug. 17, 2002, provisional application No. 60/341,780, filed on Dec. 17, 2001.

(51) Int. Cl.
A01K 7/04 (2006.01)
A01K 7/06 (2006.01)

(52) U.S. Cl. .............................. 119/75; 119/72; 119/78

(58) Field of Classification Search ................. 119/72, 119/74, 75, 76, 77, 78, 79, 80, 81, 72.5
See application file for complete search history.

(56) References Cited

U.S. PATENT DOCUMENTS

| | | | | |
|---|---|---|---|---|
| 2,600,103 A | * | 6/1952 | Feck ............................ | 119/77 |
| 2,678,630 A | * | 5/1954 | Frederiksen ................. | 119/75 |
| 2,790,417 A | * | 4/1957 | Brembeck ................... | 119/81 |
| 3,505,978 A | | 4/1970 | Nilsen | |
| 3,527,193 A | | 9/1970 | Smith ......................... | 119/72.5 |
| 3,550,560 A | * | 12/1970 | Edstrom ..................... | 119/72.5 |
| 3,812,823 A | * | 5/1974 | Ridder et al. ................. | 119/54 |
| 3,868,926 A | | 3/1975 | Olde ............................ | 119/75 |
| 3,941,094 A | * | 3/1976 | Nilsen, Jr. .................... | 119/80 |
| 4,047,503 A | | 9/1977 | Wilmot ........................ | 119/75 |
| 4,089,350 A | | 5/1978 | Gustin .......................... | 138/45 |
| 4,138,967 A | | 2/1979 | Tamborrino .................. | 119/78 |
| 4,187,804 A | * | 2/1980 | von Taschitzki ............ | 119/72.5 |
| 4,199,000 A | | 4/1980 | Edstrom ...................... | 137/206 |
| 4,258,666 A | * | 3/1981 | Edstrom ....................... | 119/72.5 |
| 4,282,831 A | | 8/1981 | Nilsen ......................... | 119/75 |
| 4,307,682 A | * | 12/1981 | Bollman ....................... | 119/75 |
| 4,320,891 A | | 3/1982 | Cairns .......................... | 251/332 |
| 4,370,948 A | | 2/1983 | Atkins ......................... | 119/72.5 |
| 4,402,343 A | | 9/1983 | Thompson et al. ......... | 137/614.2 |
| 4,416,221 A | | 11/1983 | Novey ........................ | 119/72.5 |
| 4,538,791 A | | 9/1985 | Wostal ........................ | 251/339 |
| 4,539,938 A | * | 9/1985 | Maranell et al. .............. | 119/75 |
| 4,779,571 A | | 10/1988 | Row ............................ | 119/75 |
| 4,819,585 A | | 4/1989 | Dolan et al. ................. | 119/72.5 |
| 5,003,927 A | | 4/1991 | Thompson ................... | 119/72.5 |
| 5,065,700 A | | 11/1991 | Cross .......................... | 119/72.5 |
| 5,070,817 A | | 12/1991 | Momont ....................... | 119/75 |
| 5,456,210 A | | 10/1995 | Miller .......................... | 119/75 |
| 6,003,468 A | | 12/1999 | Edstrom, Sr. et al. ....... | 119/72.5 |
| 6,073,584 A | * | 6/2000 | Schumacher ................. | 119/72 |

FOREIGN PATENT DOCUMENTS

| | | | | |
|---|---|---|---|---|
| EP | 0408807 | * | 1/1991 | |
| EP | 0554884 | * | 8/1993 | |
| GB | 2134765 | * | 8/1984 | |

* cited by examiner

*Primary Examiner*—Peter M. Poon
*Assistant Examiner*—David Parsley
(74) *Attorney, Agent, or Firm*—Kolisch Hartwell, P.C.

(57) ABSTRACT

A system for accepting fluid from a source supply, then ejecting it along a substantially non-radial laterally oriented locus such that the fluid enters a cup with a mixing effect but with only minimal splashing, typically including a restriction element frame which substantially bisects the cup serves to control access thereto and a float based automatic flow restricting element; and methodology for its use in the liquid feeding of animals such as piglets.

13 Claims, 6 Drawing Sheets

LATERALLY EJECTING FLUID FLOW CONTROL SYSTEM AND METHOD

This Application is a CIP of application Ser. No. 10/128,223 Filed Apr. 24, 2002, now abandoned and claims benefit of Provisional Applications No. 60/341,780, filed Dec. 17, 2001 and No. 60/404,001 Filed Aug. 17, 2002.

TECHNICAL FIELD

The disclosed invention relates to systems and methods for controlling fluid flow, and more particularly to a system comprising means for accepting fluid from a source supply, then ejecting said fluid along a non-radial laterally oriented locus substantially without any upward or downward orientation such that said fluid enters a cup with a mixing effect, but with only minimal splashing out thereof. Preferably a restriction element frame substantially bisects the cup as viewed from above and serves to control access to flow ejection control rod means which project in a plane defined thereby, and an automatic fluid ejection limiting float element control further distinguish the disclosed system. The disclosed system finds application in a methodology for the liquid feeding of animals, such as piglets.

BACKGROUND

Particularly in the last decade, supplemental feeding of piglets with a liquid feed has become increasingly popular as a supplement to, or even as a replacement to sow feeding. Supplemental feeding of piglets can be practiced in addition to sow feeding by isolating a liquid feeder away from the sow, and it has been found that with the aide of a liquid feeder piglets can be weaned as soon as two days after birth. Supplemental feeding has additionally proven to provide many other benefits such as production of stronger, healthier piglets of increased early weight, along with a reduced death rate. Such benefits serve to produce more pounds of pork per sow.

There are presently cup-based liquid feeders available in the marketplace, use of which have demonstrated proven utility. Most such cup-based liquid feeders incorporate what is termed an "Edstrom" liquid feeder system. While performing the basic function required thereof, Edstrom liquid feeders demonstrate inefficiencies which innovation in system design could eliminate. Said inefficiencies include:

1. When liquid feed delivery lines are under pressure, liquid feed (eg. milk), can spray upward and not become contained in an associated cup. It even occurs that, liquid feed is sprayed into the face of a piglet when the cup is relatively empty, and this "spray" action can:
    waste liquid feed; and
    even scare young piglets away from the liquid feeder system, thus lowering the pressure at which a system operates would enable better results being achieved with only minimal splashing of fluid out thereof;

2. As piglets grow older they often become more active and some tend to "playfully" over-activate a "spray" causing liquid feeder system to the point that liquid feed is wastefully ejected beyond the cup, or fills and then wastefully overflow-spills from the cup, thus means limit access to the "spray" causing system means and prevent over activation thereof would enable achieving better results;

3. When liquid feed sits in a cup solids therein separate out and accumulate at the bottom thereof, thereby often becoming waste, therefore a liquid injection means and technique for keeping solids from separating out would enable achieving better-results; and 4. If liquid feed lines lose pressure, liquid feed in a cup can flow back thereinto and contaminate source liquid feed, thus including means to prevent backflow into the source would enable achieving better results.

The invention disclosed herein addresses the foregoing points and provides system and method improvements in the identified areas.

With the disclosed invention in mind, Patent Searching was conducted. Perhaps the most relevant is U.S. Pat. No. 5,456,210 to Miller which describes a watering system for poultry and the like. The system includes a deflector bell which guides water jets downward into a cup. A perceived problem with this system is that if water is ejected at high pressure it can bounce from the bottom of the cup and splash vertically out of the cup. If used to feed piglets, they can be startled by either direct vertical ejection or such reflected vertical ejection. In contrast, it is noted that a substantially lateral fluid ejection would provide utility. Further, it is noted that the 210 system is designed for use by poultry, which tend not to effectively mix liquid feed as they feed. Piglets, on the other hand, feed by forcing their snouts into a cup, and by said action tend top naturally keep solids in liquid in suspension.

Another Patent, U.S. Pat. No. 4,779,571 to Row describes a system which allows watering poultry which includes a cup with a raised central plateau portion that defines a cup supply hole fed from a connecting passage. A pecking tip is present, motion of which allows water passage past said cup supply hole.

Another Patent, U.S. Pat. No. 5,070,817 to Momont describes a system with a back flow preventing means. U.S. Pat. No. 4,402,343 to Thompson et al. also describes a system with back flow preventing means therewithin.

U.S. Pat. No. 4,538,791 to Wostal describes a valve mechanism for a livestock watering bowl. The valve is operated by a plunget motion.

Additional Patents which describe systems which include the presence of back-flow restricting means are:
    U.S. Pat. No. 4,199,000 to Edstrom Sr. et al.
    U.S. Pat. No. 4,282,831 to Nilsen;
    U.S. Pat. No. 4,187,804 to von Taschitzki;
    U.S. Pat. No. 4,138,967 to Tamborrino;
    U.S. Pat. No. 4,047,503 to Wilmont;
    U.S. Pat. No. 3,868,926 to Olde;
    U.S. Pat. No. 3,527,193 to Smith; and
    U.S. Pat. No. 3,505,978 to Nilsen.

As regards systems which can be activated by mechanical action to cause liquid to flow therefrom, the most relevant Patents are:
    U.S. Pat. No. 4,089,350 to Gustin;
    U.S. Pat. No. 5,003,927 to Thompson; and
    U.S. Pat. No. 6,003,468 to Edstrom Sr. et al.
    U.S. Pat. No. 3,941,094 to Nilsen Jr.

Additional Patents which describe functionally relevant systems are:
    U.S. Pat. No. 5,510,177 to Edstrom Sr. et al.
    U.S. Pat. No. 5,065,700 to Cross;
    U.S. Pat. No. 4,416,221 to Novey;

U.S. Pat. No. 4,370,948 to Atkins;
U.S. Pat. No. 4,819,585 to Dolan et al.
U.S. Pat. No. 4,320,891 to Cairns.
U.S. Pat. No. 3,550,560 to Edstrom.

Importantly, it is particularly pointed out that no identified Patent describes a system for providing fluid to a cup, which as positioned/viewed in side elevation has substantially vertically projecting side(s) and a substantially closed bottom through which projects a means for accepting fluid, which system further comprises means for ejecting fluid entered thereinto in an essentially lateral, off radius oriented locus, such that said fluid enters into said cup in a "swirling" manner conducive to keeping feed mixed into liquid, and further has a cup bisecting restriction element frame for controlling animal access. The presently disclosed invention system teaches such a fluid flow control system that also comprises means for preventing back-flow of fluid entered thereinto, back into a source of said fluid and which operates at a lower fluid feed source pressure than do conventional feeder systems.

DISCLOSURE OF THE INVENTION

The disclosed invention includes both system and methodology of its use. The system comprises a functional combination of a cup, a nipple housing, a rod means, and means for accepting fluid.

The cup, as viewed in side elevation, is open at the top thereof, has substantially vertically projecting side(s), and a bottom which is substantially closed except for an opening for receiving said nipple housing. Said nipple housing is preferably essentially tubular in shape and vertically projects through the bottom of said cup, in which it is secured.

The nipple housing further comprises at least first and second diameter reducing restrictions therewithin with the first thereof being positioned above the second thereof. Below ea ch of said first and second diameter reducing restrictions there is at least one seal means. Said nipple housing further comprises at least one laterally facing hole through the essentially vertical projection thereof, at a vertical location below the vertical level of the top of said cup and above the vertical level of the bottom of said cup.

The means for accepting fluid is present in said nipple housing and comprises a hole, which hole is functionally sealed with a pressure operated back-flow preventing plug means until source fluid, provided externally, presents sufficient pressure on said pressure operated back-flow preventing plug means to effect fluid-forward entry through said hole. (It is noted that while most piglet feeder systems operate based on 30–40 psi, the disclosed piglet feeder system can operate at 10–20 psi).

The rod means is substantially of one diameter over the majority of its length, but has a substantially abrupt larger diameter neat its lower aspect, and said substantially abrupt larger diameter portion has upper and lower surfaces.

Said rod means is positioned in said system for providing fluid to a cup such that it projects substantially vertically, upwardly out of said nipple housing through the seal means associated with the first restriction, simultaneous with the upper surface of said rod means substantially abrupt larger diameter being in contact with the seal means associated with the second restriction.

In use source fluid is provided in contact with the back-flow preventing plug means at a sufficient pressure, (eg. 10–20 PSI), to cause said back-flow preventing plug means to allow said source fluid entry into said nipple housing, wherein it contacts the lower surface of said substantially abrupt larger diameter of the lower aspect of said rod means. Further when said rod means is, (by application of physical force to its upper end which projects through the seal associated with the first restriction in said nipple housing and out of said nipple housing), caused to project other than substantially vertically, said seal means associated with the second restriction is caused to receive and allow fluid to pass vertically therethrough and thereafter be ejected from said at least one hole through the vertical projection of said nipple housing, said fluid being ejected substantially laterally into said cup substantially without a upward or downward component and preferably along a non-radial locus which serves to cause fluid in the cup to undergo a swirling motion which keeps solids in solution. It is noted that the seal means associated with the first restriction continues to prevent substantially all fluid from flowing essentially vertically there-past during said usage.

Another recitation of a disclosed invention system for providing fluid to a cup, provides that said cup, as presented in side elevation, has a bottom, a substantially open top and substantially vertically projecting sides. Said system further comprises means for accepting fluid projecting through the bottom of said cup, and means for ejecting said fluid into said cup along a substantially horizontally oriented locus, rather than along a substantially upward or downward oriented locus, said system having no elements present therewithin to influence fluid ejection into said cup along a locus with a generally upward or downward component. Said system is distinguished in that:

- there is a restriction element frame present at least partially within said cup in a plane which substantially bisects said cup; and
- the means for ejecting said fluid into said cup ejects fluid substantially laterally along a locus which is non-radially so that it approaches at an angle to a substantially vertically projecting cup side.

It is also noted that the cup can have a substantially flat lower inner surface, which the substantially vertically projecting sides meet at a substantially ninety degree angle, or said inner bottom surface can be concave upward.

A method of the disclosed invention comprises the steps of:

a) providing a system as described above;
b) making a source of fluid available to said means for accepting fluid, external to said cup; and
c) allowing animals access to said rod means;

such that said animals cause said rod means to be moved with the accompanying result being that fluid enters into said cup via said at least one hole through the vertical projection of said nipple housing, along a locus which is substantially laterally oriented.

A presently disclosed system for providing fluid to a cup, can be more concisely described, as viewed in side elevation, as having an open top, substantially vertically projecting sides and means for accepting fluid projecting through the bottom of said cup, said system including means for ejecting said fluid into said cup along a substantially laterally oriented locus. A preferred arrangement provides that the means for ejecting said fluid into said cup ejects fluid thereinto substantially horizontally. Further, a preferred arrangement provides that the means for accepting fluid accepts fluid entered thereinto along a substantially vertically oriented locus.

A more detailed description provides that the means for accepting fluid is incorporated into a nipple housing which further comprises a rod means situated therewithin, said rod means being accessible from atop the cup and functionally incorporated with said means for accepting fluid such that movement of said rod means causes said means for accepting fluid to allow fluid to enter into said cup via said means for ejecting said fluid, again along a substantially laterally oriented locus.

Further, it is preferred that said means for accepting fluid comprises a hole, said hole being functionally sealed with a back-flow preventing plug means until source fluid presents sufficient pressure to move said back-flow preventing plug means and allow said fluid entry through said hole.

Where the system for providing fluid to a cup is constructed such that said means for accepting fluid is contained within a nipple housing, it should be clear that it is the later which directly projects substantially vertically into the cup through the otherwise closed bottom thereof. The nipple housing is then positioned such that source fluid which flows past said back-flow preventing plug means, enters thereinto. Again, the nipple housing further comprises therewithin a rod means which projects from said nipple housing such that said projected rod means is made accessible at the top of said cup. Said rod means is functionally incorporated with said means for accepting fluid such that movement of said rod means causes said means for accepting fluid to allow fluid to flow into said nipple housing and enter into said cup along a substantially laterally oriented locus.

A preferred system provides that said rod means projects from said nipple housing through a first seal means which prevents substantially all fluid from passing vertically therethrough. A lower aspect of said rod means is substantially abruptly broadened in diameter, and there is a second seal means present atop said broadened lower aspect, said second seal being in contact, at an upper aspect thereof, with retaining means in said nipple housing such that when said rod means is positioned to project substantially vertically, fluid present in said nipple housing therebelow can not flow upward, but such that when said rod means is caused to be moved so as to project other than substantially vertically, a flow path is opened past said broadened lower aspect of said rod means, and past said second seal means. (Note, minimal fluid flow upward might occur past the seals in a disclosed invention system, but such is unintentional and minimal compared to that which intentionally is caused to flow upward in prior art systems).

Again, a disclosed invention system for providing fluid feed to a cup, basically provides that said cup, as viewed in side elevation, again has an open top, substantially vertically projecting side(s), and further comprises an opening in the bottom thereof through which means for accepting fluid project. Said disclosed system further comprises means for ejecting said fluid into said cup along a substantially laterally oriented locus, as well as a rod means situated substantially within said cup. Said rod means is functionally incorporated into said means for accepting fluid such that movement of said rod means causes said means for accepting fluid to allow fluid to enter into said cup along a substantially laterally oriented locus.

A method of the disclosed invention comprises the steps of:
a) providing a system as described above;
b) making a source of fluid available to said means for accepting fluid, external to said cup; and
c) allowing animals access to said rod means;

such that said animals cause said rod means to be moved with the accompanying result being that fluid enters into said cup along a locus which is substantially laterally oriented.

It is to be appreciated that a presently disclosed system for providing fluid feed to a cup, which system comprises:
means for accepting fluid which project through a lower aspect of said cup;
means for ejecting said fluid into said cup when caused to do so by movement of a rod means which is situated substantially within said cup and is functionally incorporated into said means for accepting fluid such that movement of said rod means causes said means for accepting fluid to allow fluid to enter into said cup, the amount of fluid flow caused being generally greater for a greater amount rod means movement;

can be characterized in that means for limiting the amount of motion allowable to said rod means is removably affixed thereto.

The disclosed invention can also comprise a system for providing fluid to a cup, said cup, as presented in side elevation, having a bottom, a substantially open top and substantially vertically projecting sides, said system further comprising means for accepting fluid projecting through the bottom of said cup. In said means for accepting fluid is incorporated in a nipple housing which further comprises a rod means situated therewithin, said rod means being accessible from atop said cup and functionally incorporated into said means for accepting fluid such that movement of said rod means causes said means for accepting fluid to allow fluid to enter into said cup via said means for ejecting said fluid into said cup. Importantly, an annular space between said nipple housing and said rod means therewithin is smaller at its top than it is therebeneath, and said annular space has a float therewithin such that if fluid accumulates withing said cup and annular space, said float rises in said annular space and serve to automatically restrict possible rod means motion. When fluid level lowers, the float lowers an increased rod means motion is again possible.

Finally, it should be appreciated that the disclosed invention teaches a system and methodology of its use, which, while providing liquid feed to piglets addresses and simultaneously overcomes a plurality of selections from the group:
prevents liquid feed, (eg. milk), from being sprayed upward and not becoming contained in an associated cup, or being sprayed into the face of a piglet when the cup is relatively empty, which action can waste liquid feed and even scare young piglets away from the liquid feeder system;
provides means to prevent piglets from "playfully" overactivating a "spray" causing liquid feeder system to the point that liquid feed is wastefully ejected beyond the cup, or fills and then wastefully overflow-spills from the cup;
provides means for ejecting liquid feed into a cup using a liquid injection means and technique for keeping solids from separating out;
provides means for preventing liquid feed in a cup from flowing back into the source thereof and contaminate source liquid feed if pressure is source lost, which pressure is maintained at below 30 psi and is preferably between 10–20 psi; and
provides means for utilizing higher than 10–20 psi without overfilling a cup.

The disclosed invention will be better understood by reference to the Detailed Description Section of this Specification, with reference to the Drawings.

SUMMARY

It is a primary purpose and/or objective of the disclosed invention to teach a fluid feeder system comprising at least one selection from the group:

means for accepting fluid from a source supply and ejecting said fluid along a substantially laterally oriented non-radial locus such that said fluid enters a cup in a manner which causes said fluid to "swirl" with the result being that solids are kept in solution; and     a restriction element frame present at least partially within said cup in a plane which substantially bisects said cup which serves to limit access to said cup and rod means, said rod means being substantially present within the plane of said restriction element frame.

Stated alternatively, it is a primary purpose of the disclosed invention to teach a system for accepting fluid from a source supply, then ejecting said fluid along a substantially non-radial laterally oriented locus substantially without intended upward or downward orientation such that said fluid enters a cup with a mixing effect, but with only minimal splashing out thereof; said system also comprising a restriction element frame which substantially bisects the cup and serves to control access thereto, a rod means for controlling fluid ejection being substantially within an access limiting plane formed by said restriction element frame; said system finding application in a methodology for the liquid feeding of animals such as piglets.

It is another purpose and/or objective of the disclosed invention to, in a fluid feeder system, teach means for controlling the amount of fluid flow into a cup by motion of a rod means, and further to control the amount of motion allowed to said rod means by removably affixing a means for limiting rod means motion thereto.

It is yet another purpose and/or objective yet of the disclosed invention to teach a system in which fluid is entered via means for accepting fluid projecting through the bottom of said cup at a pressure of less than 30 psi, and preferably between 10–20 psi.

It is another purpose and/or objective yet of the disclosed invention to teach use of a cup with a flat bottom.

It is another purpose and/or objective of the disclosed invention to teach a system and methodology of its use, which, while providing liquid feed to piglets addresses and simultaneously overcomes a plurality of selections from the group:

prevents liquid feed, (eg. milk), from being sprayed upward and not becoming contained in an associated cup, or being sprayed into the face of a piglet when the cup is relatively empty, which action can waste liquid feed and even scare young piglets away from the liquid feeder system;

provides means to prevent piglets from "playfully" over-activating a "spray" causing liquid feeder system to the point that liquid feed is wastefully ejected beyond the cup, or fills and then wastefully overflow-spills from the cup;

provides means for ejecting liquid feed into a cup using a liquid injection means and technique for keeping solids from separating out;

provides means for preventing liquid feed in a cup from flowing back into the source thereof and contaminate source liquid feed if pressure is source lost, which pressure is maintained at below 30 psi and is preferably between 10–20 psi; and     provides means for utilizing higher than 10–20 psi without overfilling a cup.

It is yet another purpose and/or objective of the disclosed invention to teach a system and methodology of its use, which system includes a reduced annular space between a nipple housing and a rod means located therewithin over a vertical distance of said annular space between a lower extent thereof and an upper extent thereof, there being a float present in said annular space which automatically adjusts rod means motion as a function of fluid level in said annular space.

Additional purposes and/or objectives will become apparent upon a reading of the Specification and claims.

DETAILED DESCRIPTION

Figure 1A:
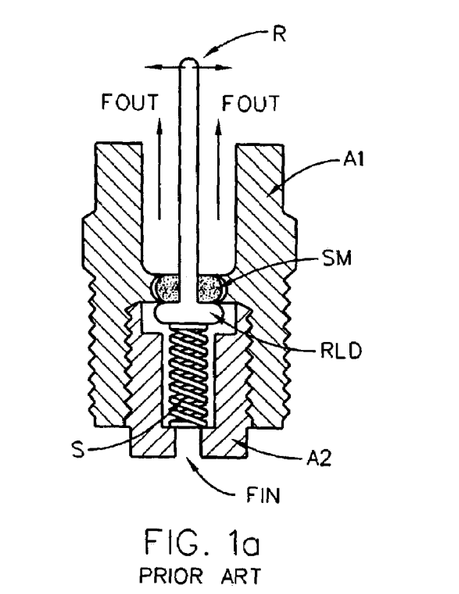
FIG. 1a shows a side-elevational-cross-section view of a typical prior art fluid feeder system in which vertically oriented fluid flow is blocked unless the Rod means is moved as shown in FIG. 1b to form a flow path (FP).
Figure 1B:
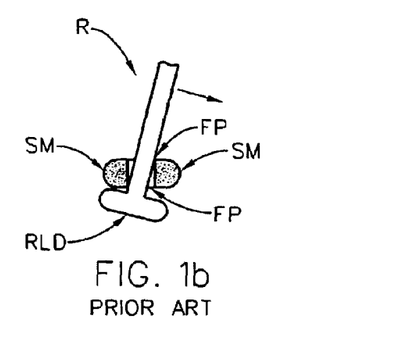
FIG. 1b shows the Rod means (R) of FIG. 1a moved to provide a fluid flow path (FP).
Figure 2:
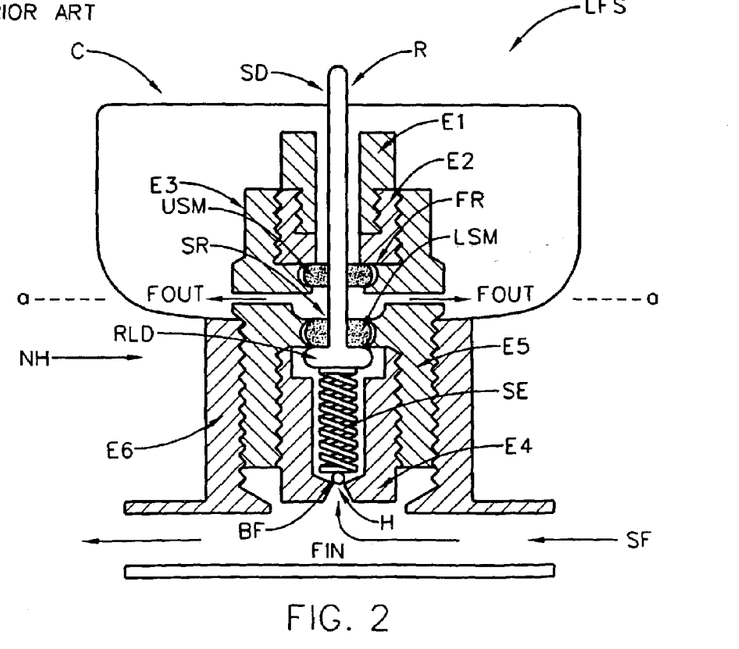
FIGS. 2, 3a 3b, 3c and 3d show side-elevational-cross-section views of various modified embodiments of the disclosed invention system.

Turning now to FIG. 1a, there is shown a typical Prior Art Fluid Feeder System. Shown are basic structural elements (A1) and (A2), and a Rod means (R) with a Substantially Abrupt Larger Diameter near its lower aspect (RLD). Also shown are a Seal Means (SM), and a Spring (S) (shown as a coil in FIG. 1a, but it is also known to use a functionally similar pliable soft mass of material), to maintain fluid sealing contact between the Substantially Abrupt Larger Diameter portion of the Rod means (R) and the Seal Means (SM). In use, when the Rod means (R) is positioned to project substantially vertically as shown, no fluid can pass from the Input (FIN) as Output (FOUT). However, when the Rod means (R) is caused to move off the shown vertical orientation, (eg. see arrows pointing to the Right or Left in FIG. 1a), as shown in FIG. 1b, the Seal Means (SM) allows fluid to pass through the Flow Path (FP), (see FIG. 1b), from input (FIN), through said Seal Means (SM), and eject substantially laterally as Fluid Out (FOUT) as identified in FIG. 1a. (It is noted at this point that, as shown in FIG. 2, a primary distinction of the disclosed invention, in any of its embodiments, over prior art systems is that the output fluid is not intentionally caused to eject vertically upward or downward, but rather ejects substantially laterally, (see indicated (FOUT) in FIG. 2), through at least one (FOUT) hole. It is also noted that the holes through which flows (FOUT) can be oriented so as to direct fluid straight toward a substantially vertical cup wall, or so as to eject fluid laterally along a locus which will cause a swirling of fluid in the cup. In either case the ejection locus will be, as viewed in side elevation, substantially lateral and is not intentionally directed upward or downward. This is considered to be an important utility providing aspect of the disclosed invention.

Turning now to FIG. 2, there is shown one embodiment (LFS) of a presently disclosed invention system. Demonstrated are a Cup (C) and basic Nipple Housing (NH) structural elements (E1) (E2) (E3) (E4) (E5) and (E6). Note that structural element (E1) screws into structural element (E2), which screws into structural element (E3), and that structural element (E4) screws into structural element (E5), which screws into structural element (E6), with structural element (E6) being functionally connected to the means for providing Source Fluid (SF), which it is noted is typically at 10–20 PSI in the presently disclosed system, as compared to 30–40 PSI in known systems for performing similar functions. Note that Structural Elements (E3) and (E5) are typically the upper and lower portions of a single continuous element. It should be appreciated that an immediate distinction of the FIG. 2 system over some Prior Art is the presence of the Back-Flow Preventing Plug (BF) atop a Hole (H) through structural element (E4). Said Back-Flow Preventing Plug (BF) serves to prevent Source Fluid entered therepast back into the Source Fluid (SF), thereby preventing contamination thereof.

It is of primary importance to note that the FIG. 2 embodiment (LFS) includes a Rod means (R) and a Seal means (LSM). The Rod mean (R) is shown to be of substantially one relatively Small Diameter (SD) over the majority of its length, (see Rod means (R) inside the Cup (C)), but has a substantially abrupt larger diameter (RLD) near its lower aspect, said substantially abrupt larger diameter portion having Upper and Lower Surfaces. Said Upper Surface is shown to contact the Lower Seal Means (LSM), and a Spring Element (SE) is shown as serving to maintain said contact. (It is also noted that the Spring Element (SE) can be utilized to maintain pressure on the Back-Flow Preventing Plug (BF)). Further note that said Upper Surface of the Lower Seal Means (LSM) is shown to be secured against a Second Diameter Restricting Means (SR) which is a part of Structural Element (E4), as combined with Structural Element (E5). With the Rod means (R) In the position shown, Source Fluid (SF) which passes through the Back-Flow Preventing Plug (BF), because it is maintained at a pressure sufficient to push the Back-Flow Preventing Plug (BF) upward, (as shown in FIG. 2), and allow Forward-Flow of Source Fluid, can not proceed past said Lower Seal Means (LSM). However, much as demonstrated by FIGS. 1b, 1f the Rod means (R) in FIG. 2 is forced to assume other than a nominal vertical orientation, a Flow Path opens and allows Source Fluid to get past-said Lower Seal Means (LSM). Again, refer to FIG. 1b to appreciate this point. The FIG. 2 system however, does not provide that such Source-Fluid which proceeds past said Lower Seal Means (LSM) exit in a substantially vertically oriented direction as is the case in a FIG. 1a system, but rather, the Upper Seal Means (USM) in a FIG. 2 system prevents substantially all said Source Fluid from doing so. Note that the Rod means (R) securely passes through said Upper Seal Means (USM), and that said Upper Seal Means (USM) is maintained in a First Diameter Restricting Means (FR) formed by Structural Elements (E2) and (E3). FIG. 2 shows that the Source Fluid exits other than along a substantially horizontally oriented locus identified as (FOUT), and in fact Source Fluid (SF) which entered along a substantially vertically oriented locus (FIN), exits substantially laterally into said Cup (C) as Fluid Out (FOUT). It should be appreciated that this minimizes the splashing of fluid out of the cup.

At this point it is beneficial to note that during use the FIG. 2 system embodiment (LFS), prevents fluid feed from being sprayed upward into the air rather into a cup. This can include being sprayed into the face of a piglet that operates the Rod means (R), when the cup is relatively empty, which "spray" action wastes fluid feed, and even scares young piglets that are not used to the cup feeder away from the fluid feeder system. Further, as piglets grow older and become more active and "playfull" they will not be tempted by the possibility of causing an upward "fluid spray", and will therefore be less likely to over activate a FIG. 2 fluid feeder system (LFS), thereby wasting fluid feed. It is also noted that in summer heat pigs learn to cool themselves by causing a spray of liquid feed into the air. As well, the FIG. 2 arrangement serves to prevent fluid feed from being wastefully ejected beyond the cup. Further, the presence of the Back-Flow Preventing Plug (BF) prevents fluid feed, (for instance, after sitting in a cup long enough so that solids therein separate out and accumulate at the bottom thereof, thereby often becoming waste), from flowing back into the Source Fluid (SF) if fluid-feed lines lose pressure. This is desirable as it prevents possible contamination of the source fluid.

It is also noted that flow restriction means can be added to limit possible rod means movement and thereby limit liquid feed flow when piglets operate a presently disclosed system, (ie. piglets will cease trying if they have to work too hard to operate the liquid feed flow).

Figure 3A:
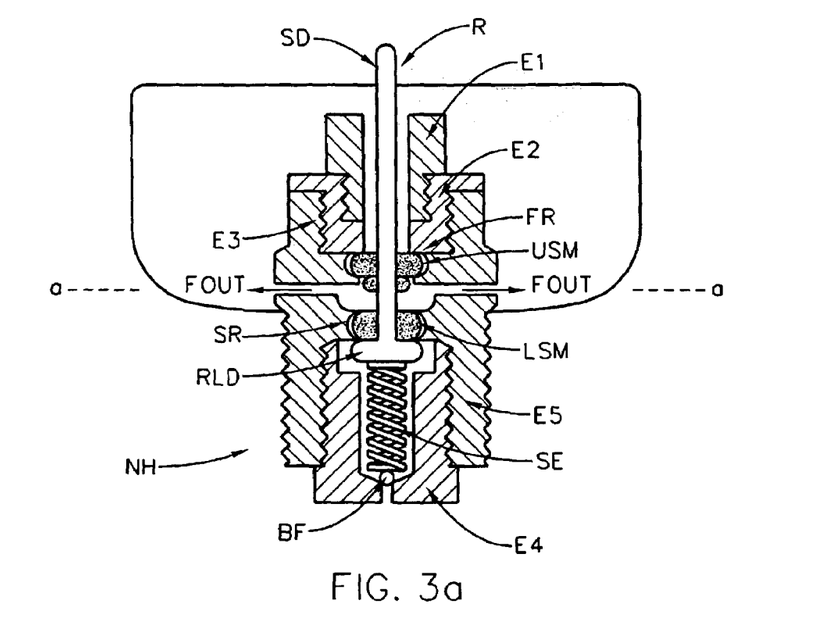
Figure 3B:
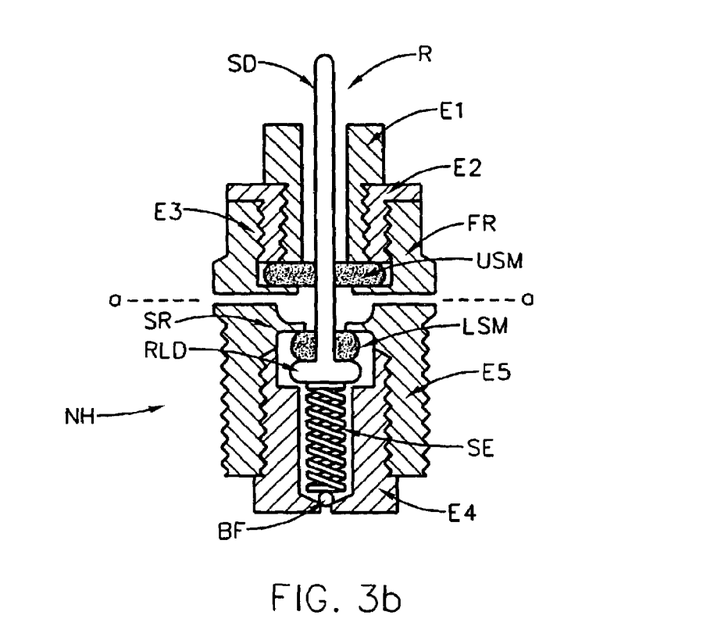

FIGS. 3a, 3b, 3c and 4 show variations on the FIG. 2 (LFS) system. Note that the major differences relate to the Upper (USM)) and Lower (LSM) Seal Means arrangements. FIG. 3a, for instance demonstrates use of two Seals to form the Upper Seal Means (USM). However, it is disclosed that any number of Seals can be used. The multiple seal arrangement better prevents Fluid from flowing substantially vertically therepast and undesirably eject much as does fluid in the FIG. 1b Prior Art system. FIG. 3b shows another modification of the Upper Seal Means (USM). Note that the FIG. 3a Upper Seal Means (USM) is contained in a First Diameter Restricting Means (FR) which is formed from structural elements (E1) (E2) and (E3) which are modified in design from the analogically similar Structural Elements in FIGS. 2 and 3a. Note that generally the same identifiers are used to identify elements in FIGS. 2, 3a–3d and detailed description of said FIGS. 3a and 3d will therefore not be presented. The reader should re-read the description of FIG. 2 with comparative reference to FIGS. 3a–3d to appreciate what is shown therein. In that light, it must be appreciated that it is not the specific design of Structural Elements which is the focus of the disclosed invention, but rather the Ejecting Fluid Low Path, (see (FOUT)) in FIG. 2 compared to that shown in the Prior Art FIG. 1a), effected by the functional combination of Structural Elements, in combination with the presence of the Back-Flow Preventing Plug (BF) in the effective Means for Accepting Fluid.

Figure 3C:
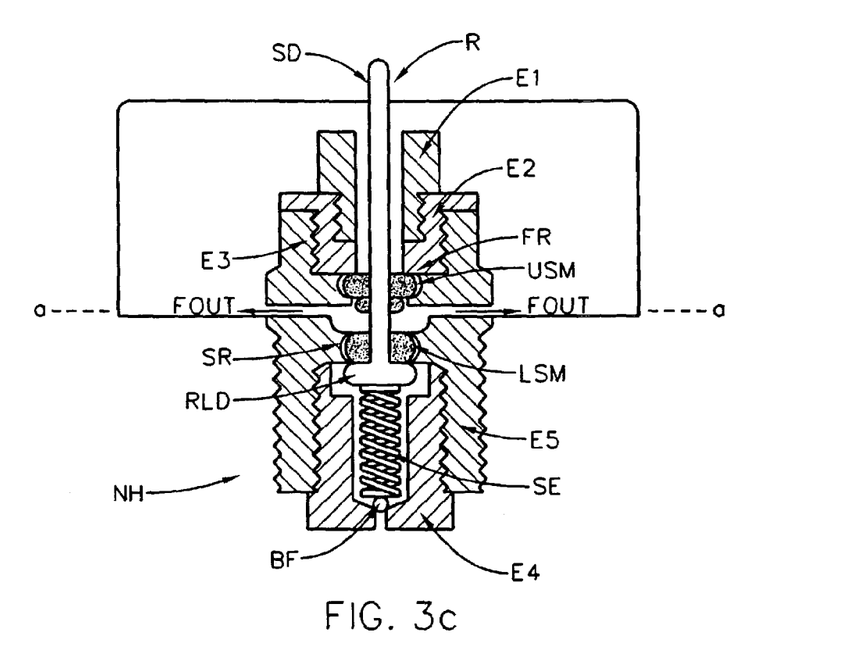
Figure 5A:
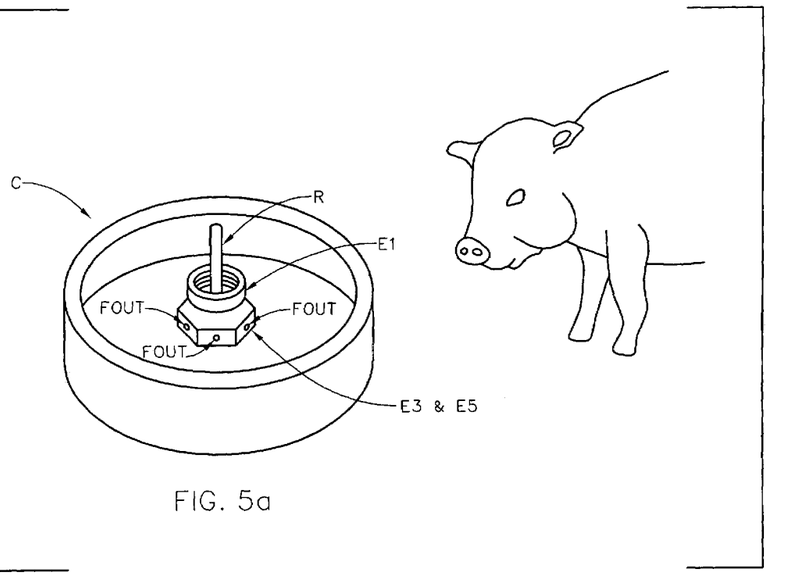
FIG. 5a shows a top perspective view of a disclosed invention system, along with indication of a piglet that can operate the Rod means (R) where it extends from the cup (C) to cause fluid feed to eject from (FOUT) holes.
Figure 5B:
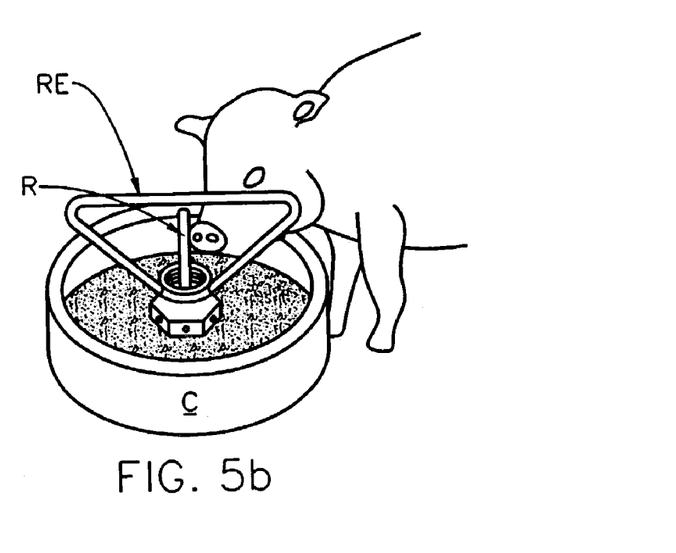
FIGS. 5b and 5c show a cup with the access restricting element (RE) being an extension of the element (E1) shown in FIG. 3d, as applied in use.
Figure 5C:
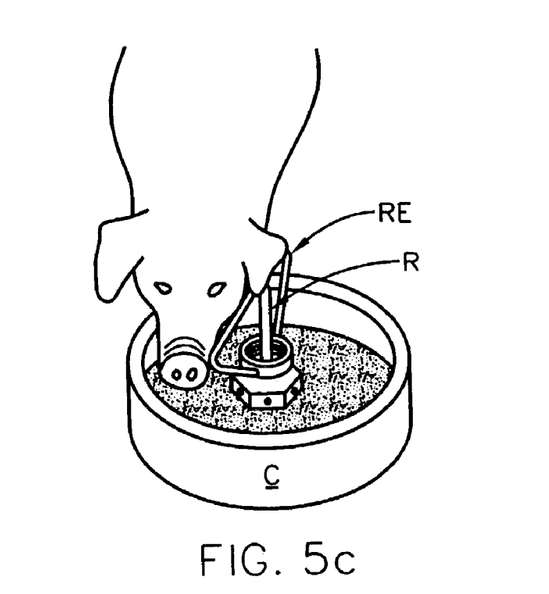

It is specifically noted that FIG. 3c shows a flat bottom Cup (C), which can be useful in embodiments as shown in FIGS. 5b and 5c, (see discussion thereof below), and indicates that the upper surface of the bottom of the Cup (C) can be located level with the Fluid output (FOUT). This arrangement directs Fluid (FOUT) flow along a locus which keeps solids in the Cup (C) in solution.

Figure 3D:
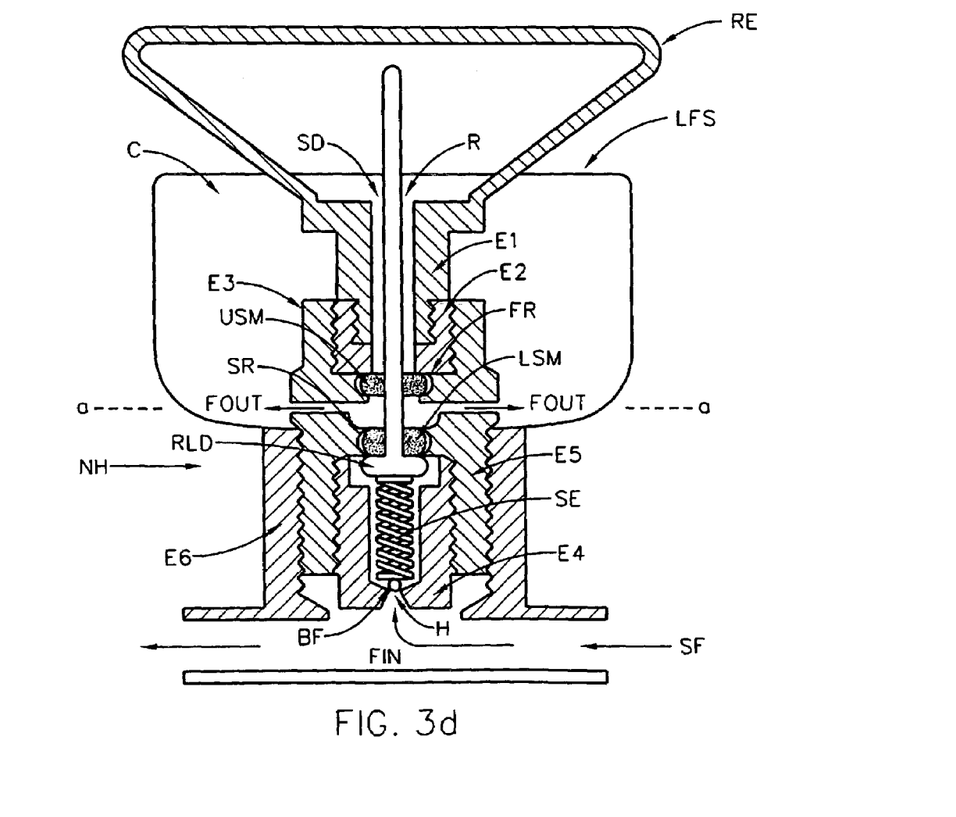

FIG. 3d requires additional description in that structural element (E1) is shown to have a Restriction Extension (RE). FIGS. 5b and 5c show a cup (C) with the access Restricting Extension (RE) of element (E1) shown in FIG. 3d applied in use. Note that piglets can access the Rod means (R), continuous operation thereof is discouraged by the presence of the Restriction Extension (RE). The Restriction Extension (RE) is best described as being a Restriction Element (RE) frame substantially present within a plane which bisects the cup (C) and contains said Rod (R). Though shown as a basically triangular shape as viewed in frontal elevation, (see FIG. 3d), and thin as viewed in side elevation, (see indication thereof in FIG. 5c), any functional shaped Restriction Element (RE) frame can be utilized, (eq. rectangular, square, diamond, oval, round etc.) and is to be considered within the scope of the claims. Further, while shown as an extension of Structural Element (E1), it is to be understood that any functional mounting of Restriction Extension (RE) frame is to be considered equivalent and within the scope of the claims if a functional configuration as shown in FIGS. 5b and 5c is achieved wherein an animal can access the Rod Means (R) from a side of the Restriction element (RE) and access fluid in the Cup (C) from one side of the Restriction Extension (RE) frame. (Note that a second animal, (not shown), could simultaneously access the Cup (C) from the side opposite to the side of the Restriction Extension (RE) frame on which is shown the piglet, but that many animals could not simultaneously have access. The presence of the Restriction Extension (RE) frame prevents overworking of the Rod Means (R) in use both by making its access more difficult and by restricting access thereto by many animals simultaneously).

While, as stated, the Structural Elements (E1), (E2), (E3), (E4) and (E5) are for the most part not critical to the invention, it must be clarified that Structural Element (E1) does serve a new and novel function, in addition to providing a base for the Restriction Element (RE) frame. Said Structural Element (E1) can be put into place for the purpose of restricting the allowed motion of the Rod means (R), so as to limit motion of the Rod Means (R) and resulting fluid flow. Where the internal diameter of element (E1) is of a size to provide snug fit around Rod (R), for instance, the fluid flow control operation of the disclosed invention can be prevented entirely. That is, the more off-substantially vertical the Rod means (R) is pushed, generally the more fluid can flow by the substantially abrupt larger diameter (RLD) portion of Rod means (R), and through the Lower Seal Means (LSM). Reference to FIG. 1b gives insight to why this is. The small internal diameter of the Structural Element (E1), limits the lateral motion possible by Rod means (R), thus limits the amount of fluid which can flow through said Lower Seal Means (LSM). It is noted that existing means for performing a similar function in other animal feeder systems are closed topped such that a rod therein can not extend out the top thereof. Said existing means for performing a similar function are bulkier and heavier and more difficult to carry in one's pocket, as is common practice. In use practitioners affix and remove such flow restricting means as their experience and judgement deem appropriate.

Note that where Structural Element (E1) serves primarily as a base for the Restriction Element (RE) frame as in FIG. 3d, the internal diameter of the hole through which Rod Means (R) projects can be of any desired functional dimension. In fact two Structural Elements (E1) can actually be provided, one as shown in FIGS. 3a and 3b with a small inner diameter hole therethrough for use in limiting Rod Means (R) motion, and one as shown in FIG. 3d with a larger hole therethrough for use in providing a mounting base for the Restriction Element (RE) frame during feeding periods when Rod Means (R) motion is not to be prevented. Also, note that Structural Element (E1) can be extended in width where it sits atop Structural Element (E3).

Figure 3E:
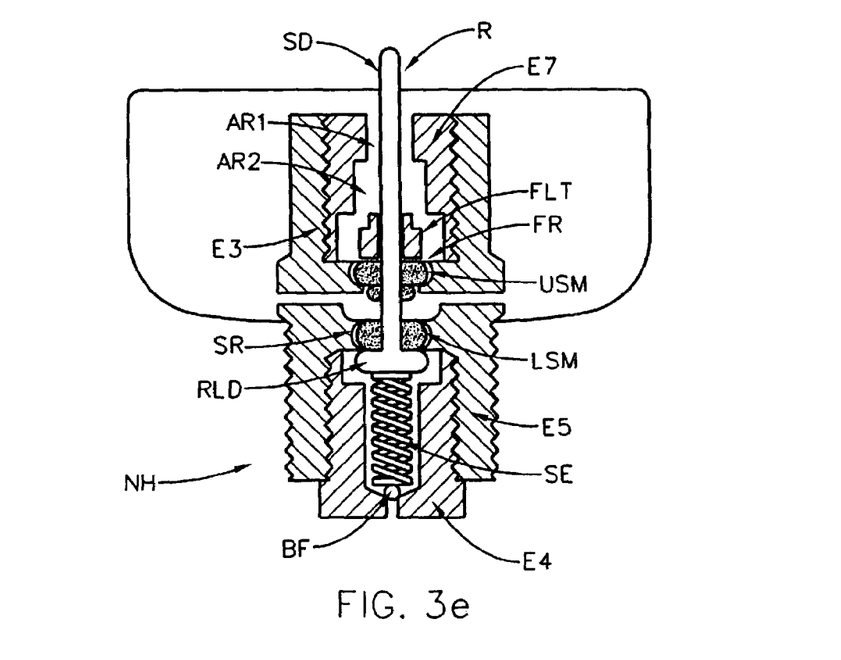
FIG. 3e shows a "Float (FLT) which automatically restricts the Rod Means (R) motion which fluid causes it to rise in Element (E7).

FIG. 3e shows a "Float (FLT) which automatically restricts the Rod Means (R) motion which fluid causes it to rise in Element (E7). It is noted that said Float (FLT) is made from a material with is buoyant in a Fluid utilized. When the Float (FLT) is located as shown it will have negligible effect on the Rod Means (R) motion, but as it rises upward in Element (E7) its shape will cause it to have two steps of Rod Means (R) motion restricting influence. It is also noted that the Fluid will enter the central region of Element (E7) mostly from atop when its level rises above the top of said Element (E7), but that in a practical sense some Fluid can also seep past the Upper Seal Means (USM). FIG. 3e shows the disclosed invention can also comprise a stepped inner diameter nipple housing which comprises the rod means situated therewithin. The Annular Space is shown to be smaller at the upper location (AR1) than it is at a lower position (AR2), such that float (FLT) rising will serve to automatically restrict possible rod means motion. When fluid level lowers the float lowers and increased rod means motion is again possible. It is noted that the "stepped" change in Annular space is not required and a gradual taper can be utilized as well, which gradual taper provides an effective smaller annular space at the top thereof.

Figure 4A:
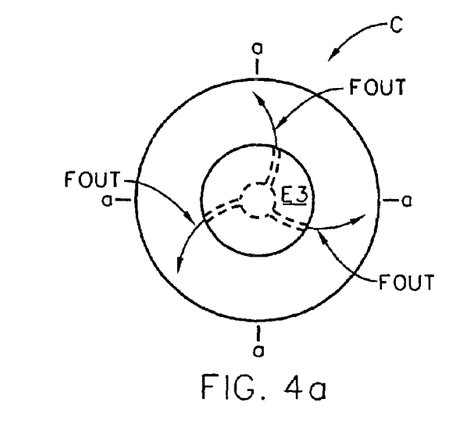
FIGS. 4a and 4b show cross-sectionals taken at a—a in FIG. 3d, and indicate fluid ejection along a non-radial fluid rotation-causing locus, and a radial locus respectively.
Figure 4B:
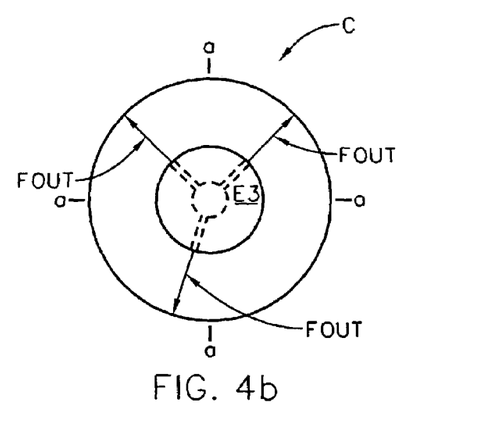

FIGS. 4a and 4b show cross-sectionals taken at a—a in FIGS. 2, 3a, 3b, 3c and 3d and indicate fluid ejection (FOUT) along three non-radial, fluid rotation-causing loci, and along three radial loci, respectively. That is to say the means for ejecting said fluid into said cup ejects fluid (FOUT) substantially laterally along a locus selected from the group consisting of:

radially so as to directly approach a substantially vertically projecting cup side; and non-radially so that it approaches at an angle to a substantially vertically projecting cup side.

Again, for emphasis, the ejected fluid (FOUT) is shown to follow a non-radial locus in FIG. 4a so that it approaches at an angle to a substantially vertically projecting cup (C) side. This is in contrast to the radial locus in FIG. 4b which causes fluid to so as to directly approach a substantially vertically projecting cup (C) side. While the FIG. 4b embodiment is unknown in the art, the FIG. 4a embodiment is believed to be very new, novel and non-obvious and is preferred as being useful in that it imparts a rotation motion to fluid in the cup which helps keep solids from settling out thereof during use.

FIG. 5a shows a top perspective view of a disclosed invention system, along with indication of a piglet that can operate the Rod means (R) to cause fluid feed to eject from shown (FOUT) holes. Note that any number of (FOUT) holes can be present, but the preferred design utilizes three (3) as in FIGS. 4a and 4b, to six (6) as indicated in FIG. 5a.

Again, it should be appreciated that Structural Elements (E3) and (E5) are typically, though not necessarily, the upper and lower portions of a single continuous element which has (FOUT) holes present in the vertical projection of said nipple housing, (at vertical location(s) below the vertical level of the top of said cup and above the vertical level of the bottom of said cup, in the context of the system shown in FIG. 2.

A disclosed invention system for providing fluid to a cup can then be described as comprising:
- a cup (C);
- a nipple housing (NH);
- a rod means (R); and
- means for accepting fluid (E6);
- a restriction element (RE) frame;

said nipple housing (NH) being located substantially within said cup (C) and comprising structural elements (E1) (E2) (E3) (E4) (E5), and (E6), said structural element (E1) being secured into structural element (E2) from atop thereof, which structural element (E2) is secured into structural element (E3) from atop thereof, and said structural element (E4) being secured into structural element (E5) from beneath thereof, said structural element (E5) being secured into structural element (EG) from atop thereof, and said structural element (E6) being the means for accepting fluid and functionally connected to the means for providing Source Fluid (SF). Said structural elements (E3) and (E5) are preferably the upper and lower portions of a functionally single continuous element. Said nipple housing has a first diameter restricting means (FR) formed by at least one of the Structural Elements (E2) and (E3) and a second diameter restricting means (SR) which is a formed by at least one of said the Structural Elements (E4) and (E5). Said structural element (E4) has a hole (H) present therein positioned to directly contact source fluid (SF), said hole (H) having a back-flow preventing plug (BF) removably present therewithin. (Note that back-flow preventing plug (BF) can be absent to allow pumping fluid easily through said system into the cup). Said rod means (R) is of substantially one relatively small diameter (SD) over the majority of its length, but has a substantially abrupt larger diameter (RLD) near its lower aspect, said substantially abrupt larger diameter portion has upper and lower surfaces, said upper surface being positioned in said nipple housing (NH) so that it contacts a lower seal means (LSM) caused to be present at said second diameter restricting means. The substantially relatively small diameter (SD) end of said rod means (R) extends out of said cup (C) and is accessible for application of orientation changing pressure thereto. A spring element (SE) is present between said lower surface of said substantially abrupt larger diameter (RLD) and said back-flow preventing plug (BF), said spring element (SE) serves to maintain said contact between the upper surface of said substantially abrupt larger diameter (RLD) of said rod means (R) and a lower surface of said lower seal means (LSM), and simultaneously to maintain source fluid flow preventing position maintaining pressure on the back-flow preventing plug (BF). (Note if the back-flow preventing plug (BF) is not present the spring element (SE) exerts force on the structural element (E4) rather than thereon). An upper surface of the lower seal means (LSM) is secured against said second diameter restricting means (SR) which is a part of at least one of the structural elements (E2) and (E3). Said rod means (R) is normally oriented to prevent forward-flow of source fluid past said lower seal means (LSM), but is movable so as to assume a position which allows a flow path to open between the upper surface of said substantially abrupt larger diameter (RLD) of said rod means (R) and said lower surface of said lower seal means (LSM) through which flow path source fluid (SF) can flow and be ejected laterally through laterally oriented holes in structural element (E3). Said rod means also passes through an upper seal (USM) present at said first diameter restricting means (FR), which upper seal means (USM) prevents substantially all said source fluid (SF) from passing therethrough. Said upper seal means (USM) is maintained in said first diameter restricting means (FR) which is formed by at least one of the structural elements (E2) and (E3). In use when the portion of said substantially relatively small diameter (SD) end of said rod means (R) which extends out of said cup (C) is caused to be moved from its normal orientation, source fluid (SF) proceeds along an substantially vertically oriented locus past said lower seal means (LSM), and exits substantially laterally into said Cup (C) as Fluid Out (FOUT);

said system being further distinguished in that:
said restriction element (RE) frame is present at least partially within said cup in a plane which substantially contains said rod means and substantially bisects said cup, said restriction element (RE) frame being a continuation of structural element (E1) and comprising upwardly oriented projections to both the right and left as viewed in elevation.

It is also specifically noted that the terminology "fluid" has been used in this Specification. Typically this should be interpreted to mean conventional "liquid" animal feed, however, the terminology "fluid" is to be understood to include any material which flows sufficiently to be processed by a disclosed invention system.

It is also to be understood that the terminology "substantially tubular" or "essentially tubular" is not to be interpreted to require that an element so described have a circular cross-sectional shape, but rather only that the element so described can perform a transport function of a fluid over some distance, said fluid being substantially confined within said element. In that same light the terminology "side(s)" is used in this Specification to mean that the identified element can have any functional number of sides or can be circular etc.

It is also noted that the language "said system being characterized by having a restriction element frame at least partially within said cup in a plane which substantially bisects said cup, said rod means being projected substantially within the plane of said restriction element frame", and the like is to be interpreted to means that said rod means direction of projection is at an angle of less than about +/−10 degrees with respect to the plane of the restriction element frame.

It Is also to be appreciated that the language "a system for providing fluid to a cup, said cup, as presented in side elevation, having a bottom, a substantially open top and substantially vertically projecting sides", does not require that the sides be absolutely vertically projecting at all locations along the length thereof, but rather it is to be considered that some curvature, especially near intersection with the bottom of the cup, can be present.

Further, it is noted that the effect of gravity on the trajectory locus of fluid ejected at 20 psi into the cup (C) is negligible over the cup (C) dimensions, thus fluid ejected substantially laterally is not noticeably deflected downward thereby even if fluid ejection is above the upper surface of the top of the cup. It is also noted that utility is derived from the fact that solids in liquid feed have a tendency to separate out and deposit as a sludge in the bottom of fluid in a cup, and that entering liquid feed laterally into a cup tends to keep said sludge mixed into suspension.

Finally, it is specifically stated that Patentability is believed found in the combination of a means for accepting fluid which projects through the bottom of said cup (C) and means for ejecting said fluid into said cup along a non-radial substantially laterally oriented locus. This is believed to be particularly true where:

the means for accepting fluid comprises a Rod means (R) which is functionally incorporated into a nipple housing (NH), and where said Rod means (R) is substantially present in the plane of a Restriction Extension (RE) frame, which plane functionally substantially bisects the cup (C), as it is viewed from atop;

and/or where a "float" is present inside the nipple housing (NH) which serves to automatically limit Rod means (R) motion, and hence the effecting of fluid flow, when ejected fluid level rises in said cup (C) and inside said nipple housing (NH). Further, the "float" and annular space in which it is present can be of any functional shape.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the claims.

I claim:

1. A system for providing fluid to a cup, said cup, as presented in side elevation, having a bottom, a substantially open top and substantially vertically projecting sides, said system further comprising means for accepting fluid projecting through the bottom of said cup, and means for ejecting said fluid into said cup;

said means for accepting fluid being incorporated in a nipple housing which further comprises a rod means situated therewithin;

said system being distinguished in that it further comprises at least one section from the group consisting of:

a restriction element frame present at least partially within said cup and in substantially vertically projecting plane which substantially bisects said cup laterally as viewed form thereabove, said rod means being projected in the plane of said restriction element, said restriction element frame comprising two sides angled and extending upwardly in opposite directions out of said cup, and a horizontal element disposed entirely outside said cup, extending between and coupling the two angled sides to form an inverted triangular shape enclosing an open space therebetween, said rod means extending outwardly from the cup and into the enclosed open space of the restriction element frame; and an annular space present between said rod means and said nipple housing, said rod means being accessible from atop said cup and functionally incorporated into said means for accepting fluid such that movement of said rod means causes said means for accepting fluid to allow fluid to enter into said cup via said means for ejecting said fluid, said annular space between said nipple housing and said rod means being smaller at its top than it is therebeneath, said annular space having an unrestrained float therewithin, such that if fluid accumulates within said annular space, said unrestrained float freely rises in said annular space and serves to automatically restrict rod means motion, said unrestrained float having a central bore and said rod means extending entirely through said bore, said float having an upper end having a smaller diameter than that of a lower end of said float.

2. A system for providing fluid to a cup as in claim 1, wherein the means for ejecting said fluid into said cup ejects fluid substantially laterally along a non-radially oriented locus and without substantial upward or downward components, so that it approaches at an non-normal angle to a substantially vertically projecting cup side, such that ejected fluid causes a swirling motion of fluid present in said cup which tends to prevent solids present therein from settling out thereof.

3. A system for providing fluid to a cup as in claim 1, wherein the cup has a inner bottom surface characterized by at least one selection from the group consisting of:

is substantially flat, which the substantially vertically projecting sides thereof meet at a substantially ninety degree angle;

is concave upward;

is functionally substantially continuous with a lower portion of means for ejecting said fluid into said cup; and is located below a lower portion of means for ejecting said fluid into said cup.

4. A system for providing fluid to a cup as in claim 1, which further comprises means for preventing fluid which enters said cup from flowing back into a source thereof.

5. A system as in claim 1 which further comprises a means for limiting the amount of motion allowable to said rod means, said means for limiting the amount of motion allowable to said rod means being removably affixed thereto.

6. A system for providing fluid to a cup comprising;

a cup;

a nipple housing;

a rod means;

means for accepting fluid;

a restriction element frame, said restriction element frame comprising two sides angled and extending upwardly in opposite directions out of said cup, and a horizontal element disposed entirely outside said cup, extending between and coupling the two angled sides to form an inverted triangular shape enclosing an open space therebetween, said rod means extending outwardly from the cup and into the enclosed open space of the restriction element frame;

said cup, as presented in side elevation, being substantially open at the top thereof, having substantially vertically projecting side(s), and having a bottom which is substantially closed except for an opening for receiving said nipple housing;

said nipple housing being substantially tubular in shape and being essentially vertically projected through the bottom of said cup;

said nipple housing further comprising at least first and second diameter reducing restrictions therewithin with the first thereof being positioned above the second thereof, below each of said first and second diameter reducing restrictions there being at least one seal means, said nipple housing further comprising at least one hole through the essentially vertical projection thereof at a vertical location below the vertical level of the top of said cup and above the vertical level of the bottom of said cup;

said means for accepting fluid being present in said nipple housing and being comprised of a hole, which hole is functionally sealed with a pressure operated back-flow preventing plug means until source fluid, provided externally, presents sufficient pressure on said pressure operated back-flow preventing plug means to effect entry though said hole;

said rod means being substantially of one diameter over the majority of its length, but having a substantially abrupt larger diameter near its lower aspect, said substantially abrupt larger diameter portion having upper and lower surfaces;

said rod means being positioned in said system for providing fluid to a cup such that it projects substantially vertically, upwardly out of said nipple housing through the seal means associated with the first restriction simultaneous with the upper surface of said rod means substantially abrupt larger diameter near its lower aspect, being in contact with the seal means associated with the second restriction;

such that in use source fluid is provided in contact with the back-flow preventing plug means at a sufficient pressure to cause said back-flow preventing plug means to allow said source fluid entry into said nipple housing, wherein it contacts the lower surface of said substantially abrupt larger diameter of the lower aspect of said rod means;

and further such that when said rod means is, by application of physical force to its upper end which projects through the seal associated with the first restriction in said nipple housing and out of said nipple housing, caused to project other than substantially vertically, and while said seal means associated with the first restriction continues to prevent substantially all fluid from flowing there-past;

said seal means associated with the second restriction is caused to receive and allow fluid to pass substantially vertically therethrough and thereafter be ejected from said at least one hole through the vertical projection of said nipple housing, said fluid being ejected in a substantially laterally oriented direction into said cup, there being no elements present therewithin to influence fluid ejection into said cup along a locus with a generally upward or downward component;

said system being distinguished in that, said restriction element frame is present at least partially within said cup in a plane which substantially bisects said cup as viewed from above, said rod means being projected substantially within the plane of said restriction element frame.

7. A system for providing fluid to a cup as in claim 6, in which there are three to six holes through the vertical projection of said nipple housing at vertical location(s) below the vertical level of the top of said cup and above the vertical level of the bottom of said cup;

said fluid being ejected into said cup in a substantially laterally oriented direction, through each thereof along a locus selected from the group consisting of:
radially so as to directly approach a substantially vertically projecting cup side; and
non-radially so that it approaches at an angle to a substantially vertically projecting cup side; and
wherein the cup has a inner bottom surface characterized by a selection from the group consisting of:
is substantially flat, which the substantially vertically projecting sides thereof meet at a substantially ninety degree angle; and
is concave upward;
said cup inner bottom surface being at a location selected from the group consisting of:
even with the luid being ejected into said cup in a substantially laterally oriented direction; and
vertically above the fluid being ejected into said cup in a substantially laterally oriented direction.

8. A system as in claim 6, which further comprises means for limiting the amount of motion allowable to said rod means, said means for limiting the amount of motion allowable to said rod means being removably affixed thereto.

9. A system as in claim 6, which further comprises means for limiting the amount of motion allowable to said rod means, said means for limiting the amount of motion allowable to said rod means being removably affixed to said nipple housing at the location where said rod means projects substantially vertically, upwardly out of said nipple housing through the seal means associated with the first restriction.

10. A system for providing fluid to a cup comprising,
a cup;
a nipple housing;
a rod means;
means for accepting fluid;
a restriction element frame, said restriction element frame comprising two sides angled and extending upwardly in opposite directions out of said cup, and a horizontal element disposed entirely outside said cup, extending between and coupling the two angled sides to form an inverted triangular shape enclosing an open space therebetween, said rod means extending outwardly from the cup and into the enclosed open space of the restriction element frame,
said nipple housing being located substantially within said cup and comprising a first structural element being secured into a second structural element from atop thereof, said second structural element is secured into a third structural element from atop thereof, a fourth structural element being secured into a fifth structural element from beneath thereof, said fifth structural element being secured into a sixth structural element from atop thereof, and said sixth structural element being the means for accepting fluid and functionally connected to a means for providing source fluid;
said third structural element being the upper portion and the fifth structural element being the lower portion of a functionally single continuous element;
in said nipple housing there being a first diameter restricting means formed by at least one of second structural element and third structural element, and a second diameter restricting means which is formed by at least one of said fourth structural element and said fifth structural element;
said fourth structural element having a hole present therein positioned to directly contact the source fluid, said hole having a back-flow preventing plug removably present therewithin;
said rod means being of substantially one relatively small diameter over the majority of its length, but having a substantially abrupt larger diameter near its lower aspect, said substantially abrupt larger diameter portion having upper and lower surfaces, said upper surface being positioned in said nipple housing so that it contacts a lower seal means caused to be present at said second diameter restricting means, an upper surface of the lower seal means being secured against said second diameter restricting means which is formed by at least one of the second structural element and the third structural element;
the substantially relatively small diameter end of said rod means extending out of said cup and being accessible for application of orientation changing pressure thereto;
a spring element being present between said lower surface of said substantially abrupt larger diameter and said back-flow preventing plug, said spring element serving to maintain said contact between the upper surface of said substantially abrupt larger diameter of said rod means and a lower surface of said lower seal means, and simultaneously to maintain source fluid flow preventing position maintaining pressure on the back-flow preventing plug;

said rod means being normally oriented to prevent forward-flow of source fluid past said lower seal means, but being at least minimally movable within said first structural element through which it projects so as to assume a position which allows a flow path to open between the upper surface of said substantially abrupt larger diameter of said rod means and said lower surface of said lower seal means through which a flow path of said source fluid can flow and be ejected laterally through laterally oriented holes in said third structural element;

said rod means also passing through an upper seal means present at said first diameter restricting means, which said upper seal means prevents substantially all said source fluid from passing therethrough;

said upper seal means being maintained in said first diameter restricting means formed by at least one of the second structural element and the third structural element;

such that in use when the portion of said substantially relatively small diameter end of said rod means which extends out of said cup is caused to be moved from its normal orientation, said source fluid proceeds past said lower seal means, and exits substantially laterally into said cup;

said system for providing fluid flow into a cup having elements present therein to direct ejected fluid at the point of its ejection through said laterally oriented holes in the third structural element, said system distinguished in that, said restriction element frame is present at least partially within said cup and in a substantially vertically projecting plane which substantially contains said rod means and substantially bisects said cup laterally viewed from above, said restriction element frame being a continuation of the first structural element, said fluid is ejected into said cup in a substantially laterally oriented direction, through each of said laterally oriented holes along a locus selected from the group consisting of;

radially so as to directly approach a substantially vertically projecting cup side, and non-radially so that it approaches at an angle to a substantially vertically projecting cup side;

and wherein the cup has an inner bottom surface selected from the group consisting of, substantially flat, which the substantially vertically projecting sides meet at a substantially ninety degree angle, and is concave upward;

said cup inner bottom surface being at a location selected from the group consisting of;

even with the fluid being ejected into said cup in a substantially laterally oriented direction; and vertically above the fluid being ejected into said cup in a substantially oriented direction.

11. A system for providing fluid to a cup, said cup, as presented in side elevation, having a bottom, a substantially open top and substantially vertically projecting sides, said system further comprising means for accepting fluid projecting through the bottom of said cup, and means for ejecting said fluid into said cup;

wherein said means for accepting fluid is incorporated in a nipple housing which further comprises a rod means situated therewithin such that an annular space is present between said rod means and said nipple housing, said rod means being substantially vertically projecting and accessible from atop said cup and functionally incorporated into said means for accepting fluid such that movement of said rod means out of said substantially vertically projecting orientation, causes said means for accepting fluid to enter into said cup via said means for ejecting said fluid;

in which said annular space between said nipple housing and said rod means is smaller at its top than it is therebeneath, said annular space having an unrestrained float therewithin, such that if fluid accumulates within said annular space, said unrestrained flat freely rises in said annular space and is adapted to automatically restrict rod means motion, said float having a central bore and said rod means extending entirely through said bore, said float having an upper end having a smaller diameter than that of a lower end of said float.

12. A system as in claim 11 which further comprises a restriction element frame present at least partially within said cup and in a substantially vertically projecting plane which substantially bisects said cup laterally as viewed from thereabove.

13. A system as in claim 11 which further comprises a means for limiting the amount of motion allowable to said rod means, said means for limiting the amount of motion allowable to said rod means being removably affixed thereto.

* * * * *